F. B. CONVERSE AND J. L. BUTLER.
TREAD ROLLING APPARATUS.
APPLICATION FILED JUNE 26, 1918.

1,314,733.

Patented Sept. 2, 1919.
4 SHEETS—SHEET 4.

INVENTORS.
Francis B. Converse & James L. Butler
BY
Robert M. Pierson
ATTORNEY

UNITED STATES PATENT OFFICE.

FRANCIS B. CONVERSE AND JAMES L. BUTLER, OF AKRON, OHIO, ASSIGNORS TO THE B. F. GOODRICH COMPANY, OF NEW YORK, N. Y., A CORPORATION OF NEW YORK.

TREAD-ROLLING APPARATUS.

1,314,733. Specification of Letters Patent. Patented Sept. 2, 1919.

Application filed June 26, 1918. Serial No. 241,990.

*To all whom it may concern:*

Be it known that we, FRANCIS B. CONVERSE and JAMES L. BUTLER, citizens of the United States, residing at Akron, in the county of Summit and State of Ohio, have invented a certain new and useful Tread-Rolling Apparatus, of which the following is a specification.

This invention relates to the manufacture of pneumatic tire casings, and its principal object is to provide improved means for rolling down the rubber tread slab or strip to cause it to adhere firmly to the carcass or body part of the tire. We aim particularly to provide an improved rolling-tool structure which may be quickly and accurately operated for its intended purpose, and to mount this or any equivalent tire-rolling means in such manner that it may readily be moved into and out of its operative position with relation to the tire-building core.

Of the accompanying drawings.

Figure 3:
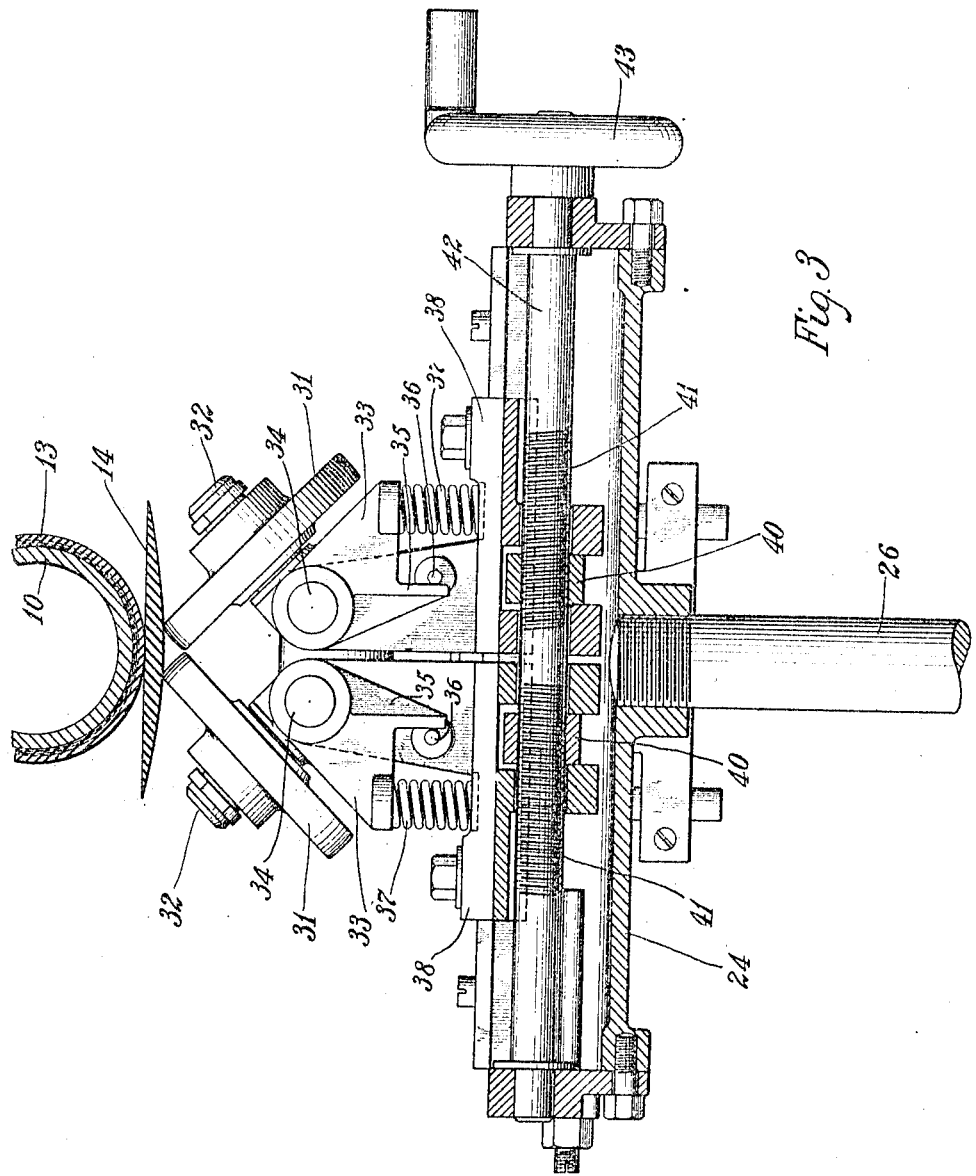
Fig. 3 is a horizontal section on the line 3—3 of Fig. 2.
Figure 4:
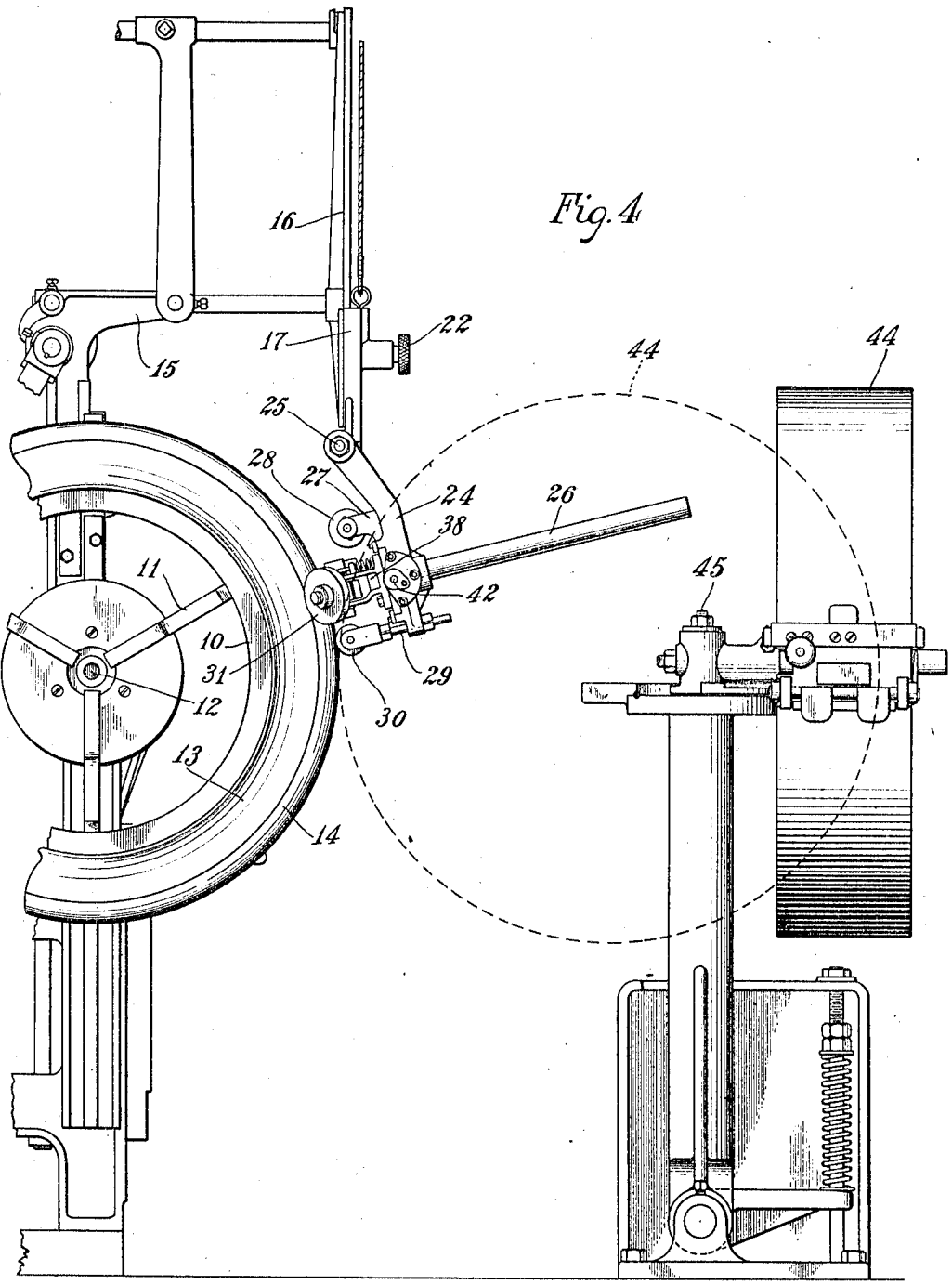
Fig. 4 is a side elevation showing the rolling apparatus in its operative relation to the core.

In the drawings, 10 is the power-driven annular mandrel or ring core mounted on the usual chuck 11 carried by the chuck-shaft 12; 13 is the tire carcass which has been laid and formed on said core, and 14 is the rubber tread strip or slab shown in its flat condition in Fig. 3 and in its rolled-down condition in Fig. 4.

Figure 1:
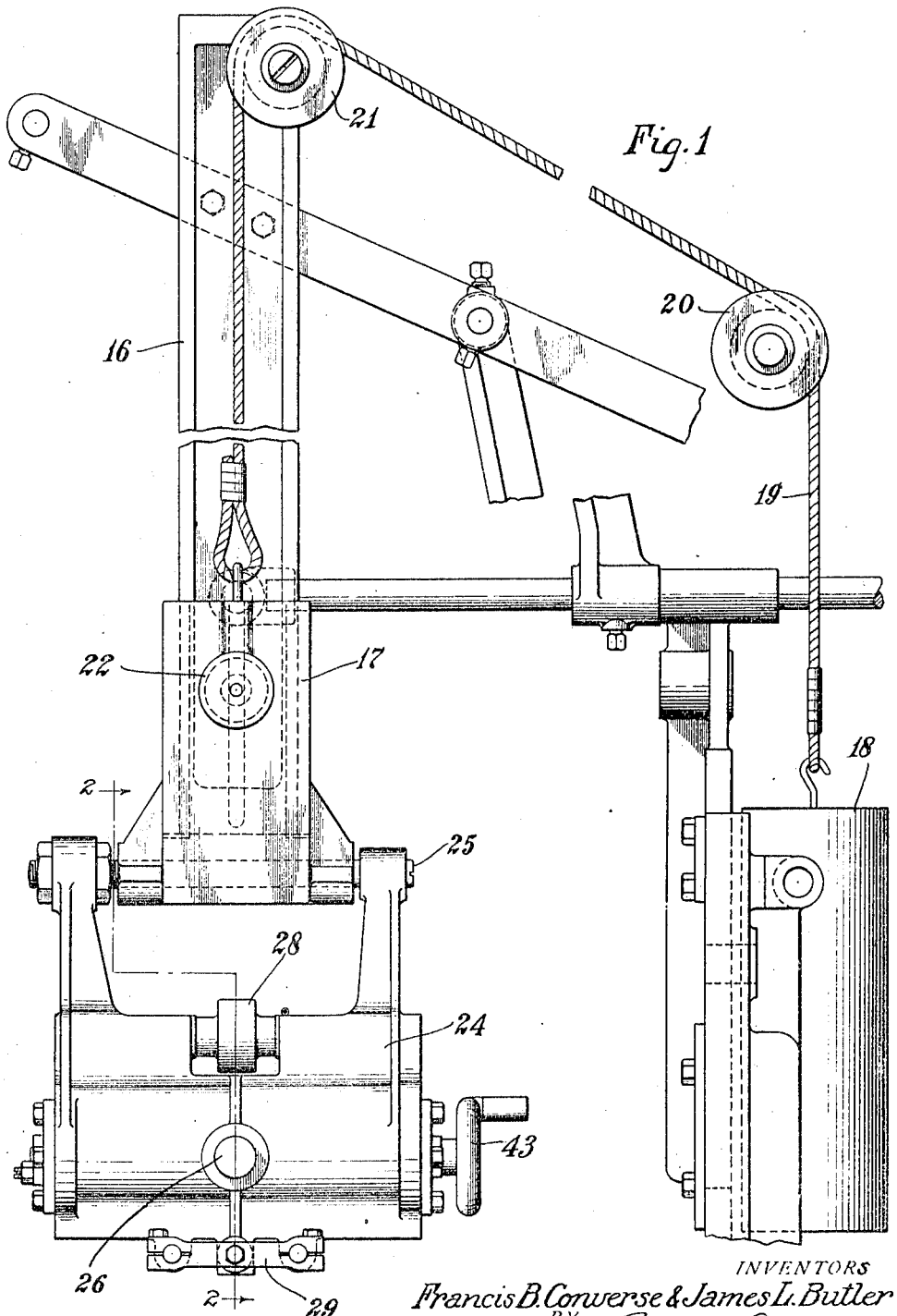
Figure 1 is a front elevation, partly broken away, showing our improved tread-rolling apparatus.
Figure 2:
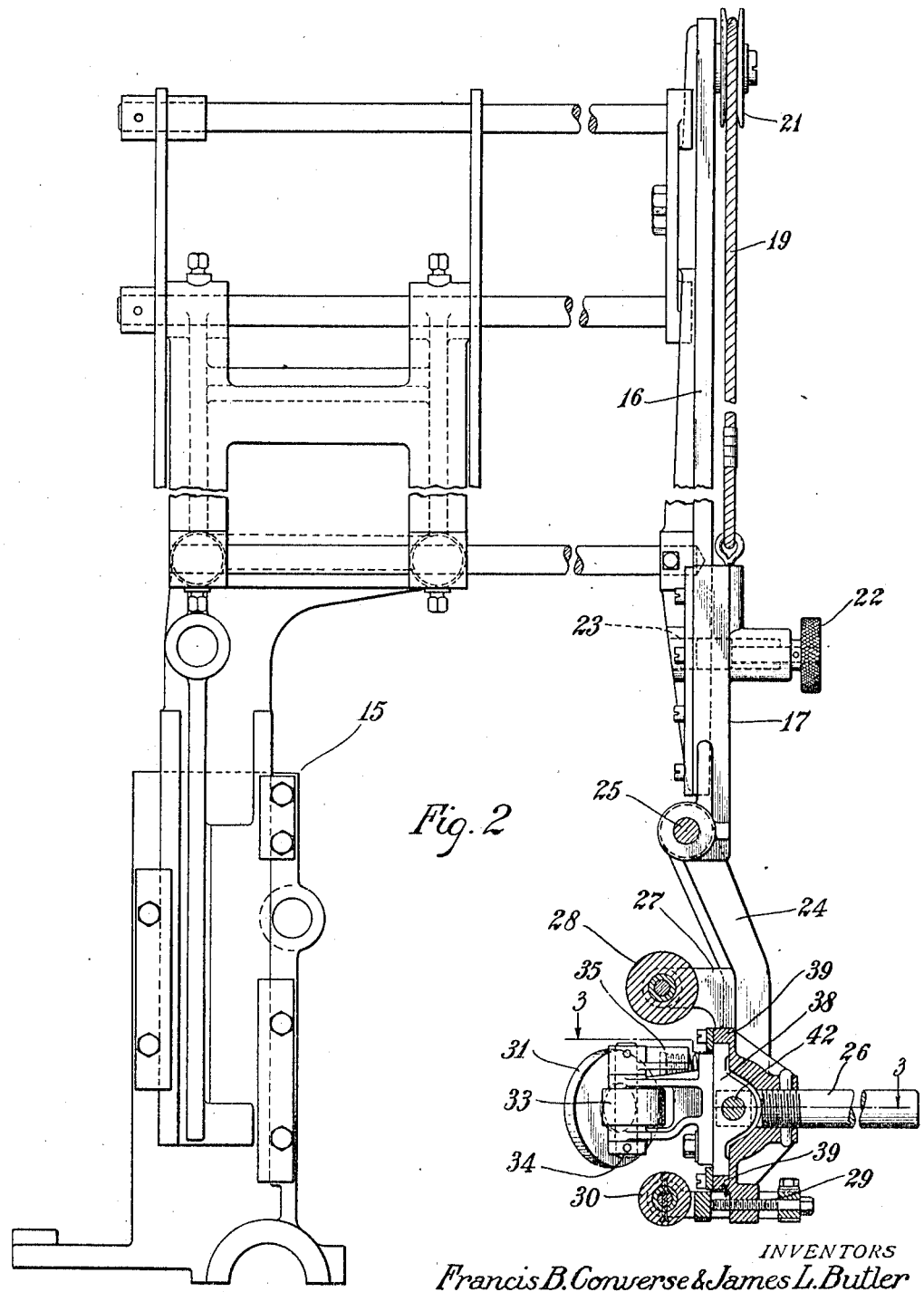
Fig. 2 is a side elevation thereof, partly in section on the line 2—2 of Fig. 1.

15 is the frame of the tire-building machine on the upper part of which, over the core, there is a vertical stationary guide 16 positioned in line with the front edge of the tire core, upon which guide is mounted a slide 17 carrying the tread-rolling apparatus, the weight of said slide and apparatus being counterbalanced by a weight 18 (Fig. 1) attached to the slide by a cord 19 passing over pulleys 20, 21. 22 is a bolt whose inner end is adapted to enter an aperture 23 (Fig. 2) in the guide for locking the slide 17 to the guide 16 in the depressed or operative position of said slide.

24 is a roller frame or carrier pivotally suspended at 25 from the slide 17 on an axis parallel with the axis of rotation of the core, so that said carrier moves in and out with respect to said core in a substantially radial direction, and also substantially horizontally by reason of being operatively positioned opposite the front edge or middle level of the core. From the back or outer side of said carrier projects a handle 26 whereby the carrier may be manipulated to move it radially and supply the necessary roll-pressure upon the tire tread. On the upper part of the carrier, on an inwardly-projecting bracket 27, is mounted a transverse roller 28 adapted to engage the middle portion of the track or guide 16 and hold the tread-rolling wheels clear of said guide when the slide 17 is moved upwardly to its inoperative position. On the lower part of the carrier, on a radially-adjustable bracket 29, is mounted a stop roller 30, adapted to engage the tire tread and limit the inward movement of the carrier 24 with reference to the core.

31, 31 are a pair of tread-rolling wheels or spinning rollers loosely mounted on stub shafts 32 which are carried by a pair of rocking supports 33 mounted on upright shafts 34, these supports having abutments 35 which are yieldingly held against stop pins 36 by means of springs 37. The shafts 34 are carried by a pair of slides 38 adjustable horizontally in guides 39 on the carrier 24, the slides being provided with nuts 40 engaging right and left screw-threads 41 on a shaft 42 which is held from axial movement on the carrier and provided at one end with a hand-wheel 43 for rotating it.

Fig. 4 shows a drum 44 whose bearing is swiveled to turn on a vertical axis 45 to bring the drum into either the transverse inoperative position shown in full lines or the operative position with reference to the core as shown by the dotted circle, this drum having means for temporarily affixing the ends of the rubber tread strip to its periphery, and being adapted, when brought into rolling relation with the periphery of the tire carcass on the core, progressively to roll said tread strip onto the tire in a manner described in the Converse Patent No. 1,270,380 dated June 25, 1918.

In the operation of our invention, a tire carcass 13 is first laid or formed upon the ring core 10 in the usual or any suitable manner. A rubber tread strip 14, mounted with its inner face outward on the periphery of the drum 44, is then progressively rolled from said drum upon the carcass while the drum occupies the dotted-line position in Fig. 4, this operation serving to locate the tread strip on the tire in a flat condition, as indicated in Fig. 3, after which said drum is swung back to its transverse position as shown in full lines. The slide 17, together with the carrier 24 and the tread rollers 31, which have occupied their elevated inoperative position on the guide 16 during the operation of locating the tread strip in place, are now brought down to their depressed operative position as shown in Fig. 4 and the slide is locked by means of the bolt 22. The operation of spinning or rolling down the side margins of the tread strip is then performed by means of the rollers 31 while the core is rotated at the desired rate of speed. Said rollers are started substantially at the middle line of the tread strip, as indicated in Fig. 3, and gradually separated by turning the hand wheel 43, which moves the slides 38 apart while pressure is applied to the rollers by means of the handle 26 on the carrier 24, the springs 37 permitting the rollers to yield slightly while they work around toward or to the edges of the tread strip, the latter being thus caused firmly to adhere to the carcass. This positive feeding of the rollers by means of the screw shaft 42 in connection with the yielding pressure furnished by the springs 37 and the radial pressure furnished by the operator to the handle 26 allows the rolling operation to be perfectly controlled.

We claim:

1. In a tire-building machine, the combination of a core adapted to rotate in a vertical plane, and a tire-forming tool having an operative position adjacent to said core, at about the middle horizontal level thereof, and an inoperative position above the core.

2. In a tire-building machine, the combination of a core adapted to rotate in a vertical plane, a roller carrier, and a spinning roller mounted on said carrier and having therewith a substantially vertical positioning movement from a depressed, operative position at about the middle horizontal level of the core, to an elevated, inoperative position, said roller and carrier also having a substantially horizontal, radial feeding movement.

3. In a tire-building machine, the combination of a core adapted to rotate in a vertical plane, a tread-applying device operating on said core at about the middle horizontal level thereof and adjustable to withdraw it from its operative position, and a tread-rolling device having an operative position adjacent to the core, substantially the same as that of said tread-applying device, said tread-rolling device being adjustable to an elevated inoperative position to make room for the operative positioning of the tread-applying device.

4. In a tire-building machine, the combination of a core mounted to rotate in a vertical plane, a vertically-movable slide, a roller carrier pivotally suspended on said slide, and a tread roller mounted on said carrier and movable therewith substantially radially of the core and transversely of the path of movement of the slide.

5. In a tire-building machine, the combination of a core mounted to rotate in a vertical plane, a vertically-movable slide, a counterweight therefor, a carrier pivoted to said slide and having a handle for moving it radially of the core, and a pair of tread-spinning rollers mounted on said carrier.

6. In a tire-building machine, the combination of a core adapted to rotate in a vertical plane, a spinning roller operative thereon, a roller-carrier supporting-member adapted to be raised and lowered to locate said roller in its inoperative and its operative positions respectively with relation to said core, and a roller carrier carrying the roller on its lower portion and pivotally suspended at its upper end on said member, for guiding the roller in a substantially horizontal radial feeding movement.

7. In a tire-building machine, the combination of a core mounted to rotate in a vertical plane, a vertically-movable slide, a fixed guide for said slide mounted above the core, a roller carrier pivoted to said slide, a tire roller mounted on said carrier, and means for holding said carrier with its roller free of the guide in the raised, inoperative position of said slide.

8. In a tire-building machine, the combination of a rotary core, a roller carrier having means for manually moving it substantially radially of the core, a pair of spinning rollers mounted on said carrier and adjustable as to their distance apart, and a tread-abutting roller on said carrier adapted to limit the inward movement of the latter with respect to the core.

In testimony whereof we have hereunto set our hands this 11 day of June, 1918.

FRANCIS B. CONVERSE.
JAMES L. BUTLER.